Feb. 6, 1962 G. SANDEFUR 3,020,065
SPRING MOUNTED FIFTH WHEEL
Filed May 11, 1960
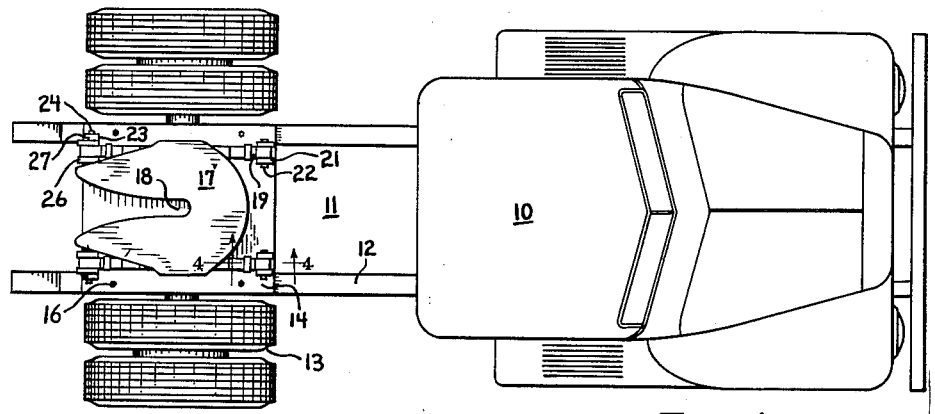
Fig.1.
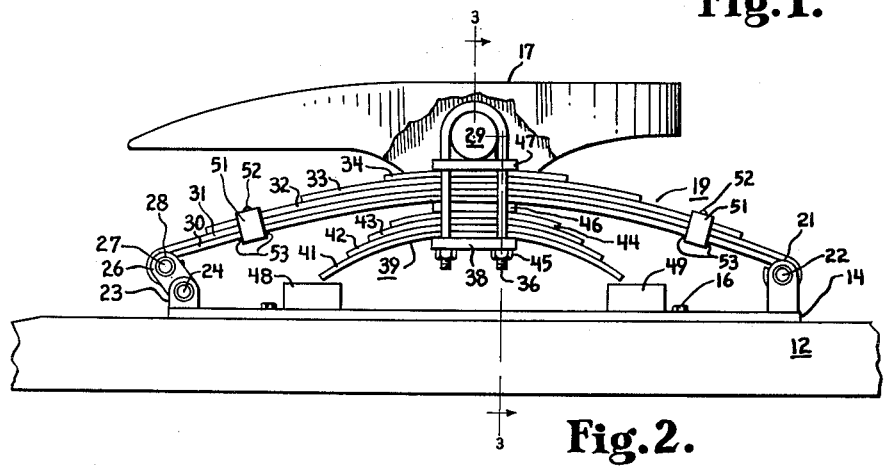
Fig.2.
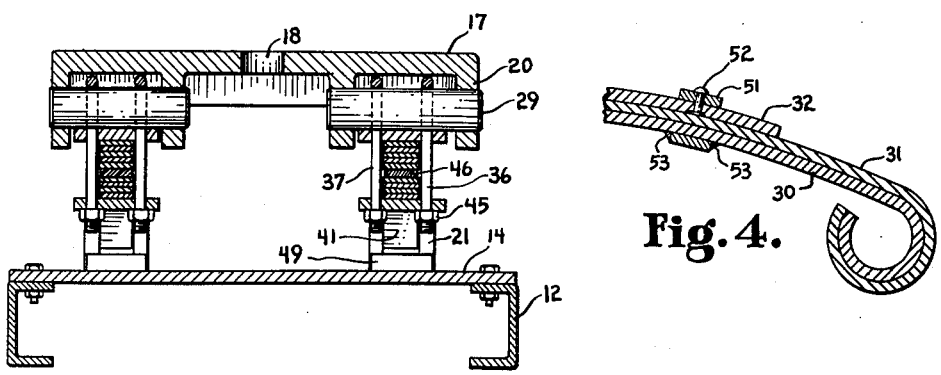
Fig.3.
Fig.4.
INVENTOR.
GEORGE SANDEFUR
BY
Lockwood, Woodard, Smith & Weikart
ATTORNEYS – # 3,020,065
SPRING MOUNTED FIFTH WHEEL
George Sandefur, Rural Rte. 1, Plainfield, Ind.
Filed May 11, 1960, Ser. No. 28,266
3 Claims. (Cl. 280—439)

This invention relates generally to trucks, and more particularly to a novel fifth wheel mounting for a truck-tractor.

It has been found that there are advantages to be derived from having a mounting of a semi-trailer to a truck-tractor which is more flexible than conventional fifth wheel mountings. Conventional fifth wheel mountings permit no rolling motion between the tractor and the semi-trailer and, therefore, cause extreme loads on the mounting units when there are torques on the tractor and on the semi-trailer which would tend to produce a relative rolling motion therebetween. Such torques are encountered particularly in operation over surfaces which are irregular, such as off-road operations. In addition to causing exceptionally high loading conditions, conventional fifth wheel arrangements tend to limit the stability and controlability of a truck-tractor in off-highway operation. Another effect of conventional fifth wheel construction is that sharp impact type loads are applied to the mounting assemblies and to the tractor suspension system when the tractor wheels located below the fifth wheel coupling traverse sharp bumps, tending to overload the tractor suspension considerably.

It is a general object of this invention to provide improved means for coupling a truck-tractor to a semi-trailer.

It is another object of this invention to provide a tractor-semi-trailer coupling adapted to better off-highway performance.

It is a further object of this invention to improve controlability of tractor-semi-trailer combinations.

It is a still further object of this invention to minimize shock loading between semi-trailers and tractors.

It is a further object of this invention to provide a flexible coupling between semi-trailers and tractors.

It is a still further object to provide means for coupling a semi-trailer to a tractor which permits greater freedom of movement between the tractor and semi-trailer.

It is a still further object of this invention to reduce wear of coupling units.

The present invention provides a spring suspension for the fifth wheel unit of a truck-tractor and in a typical embodiment uses the spring suspension exclusively for the support of the fifth wheel, employing no other solid load carrying elements or connecting links in the coupling of the fifth wheel to the tractor.

The full nature of the invention will be understood from the accompanying drawings and the following description and claims:

FIG. 1 is a plan view of a truck-tractor with a typical embodiment of the fifth wheel mounting of this invention.

FIG. 2 is a fragmentary side view enlarged to illustrate in some detail the embodiment of the fifth wheel mounting in FIG. 1.

FIG. 3 is a transverse section taken on the line 3—3 of FIG. 2.

FIG. 4 is a fragmentary longitudinal section of the spring taken along the line 4—4 of FIG. 1.

Referring to FIG. 1, there is shown a truck-tractor having a cab 10, a bed portion defined principally by the frame side members 12 and a bed plate 14. The frame is supported in conventional manner by means of a set of dual wheels 13. The bed plate 14 is fastened to the frame side members 12 in any conventional manner and in this illustration the fastening is by means of bolts 16. A fifth wheel 17, having a notch 18 therein to receive the king-pin of a semi-trailer coupling unit, is centered above the bed plate 14. The fifth wheel is supported by means of the semi-elliptic leaf spring units 19 which are fastened to the forward portion of the bed plate 14 by means of pins 22 which pass through the shackles 21 and the hooked ends of at least one leaf of the spring unit. As is characteristic of leaf springs, and as shown in the drawing, leaves normally have greater length than width or thickness. Each spring unit 19 is fastened to the bed plate 14 toward the rear of the bed plate by means of links 26 which are connected by pins 27 to the spring and by means of pins 24 to the shackles 23 which are in turn affixed to the bed plate 14.

In FIG. 2, all parts corresponding to those in FIG. 1 are represented by the same reference numerals. In FIG. 2 there is shown at each of the pin connections between a spring unit and a shackle or link, a grommet 28 which is normally made of some resilient material such as rubber. The spring unit 19 is shown to be composed of a stack of semi-elliptic spring leaves, the first and second leaves 30 and 31 having overlapping loops at each end for fastening to the shackle and link. The other leaves are 32, 33 and 34 which are fastened to the shaft 29 by means of U-bolts 36 and 37 (FIG. 3). The embodiment shown in FIG. 2 has an overload spring unit 39 having leaves 41, 42, 43 and 44. The shortest leaf 44 is separated from the first leaf 30 of the spring unit 19 by means of the separating block 46. The spring retainer plate 38, which is similar to the separating block 47 is used in cooperation with the U-bolts and the nuts 45 to hold the two spring units to the shaft 29. Abutments 48 and 49 are fastened to the bed plate 44 below the ends of the leaf 41 to provide a bearing surface for the spring unit 39 when the fifth wheel is overloaded.

FIG. 3 shows in more detail by means of the section, the construction of the embodiment of FIG. 2 and shows the attachment of the fifth wheel 17 to the shafts 29 by means of the depending portions 20.

FIG. 4 is an enlargement of the detail of the preferred spring end construction showing the strap 51 fastened by rivet 52 to leaf 32 and fastened to leaf 30 at welds 53. This novel construction provides exceptional strength.

The embodiment of the invention shown in the drawings provides for a resilient coupling between a semi-trailer and the tractor unit and avoids shock loading on the suspension and frame members of the tractor. Also, it permits a rolling motion between the tractor and the semi-trailer which may be limited to any extent desired by the stiffness of the main spring units and also by the stiffness and placement of the overload spring units. Lateral sway between the semi-trailer and the tractor is prevented because of the rigidity of the leaf springs in the direction perpendicular to the plane of the ellipse of the spring.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In combination with a tractor having a member adapted to carrying a fifth wheel; a first pair of semi-elliptic spring units shackled to said member, said spring units having their elliptical planes substantially parallel to the direction of length of the tractor; a shaft attached to each of said spring units by means of U-bolts; a fifth wheel journaled to said shafts; and a second pair of semi-elliptic spring units fastened to said first pair by said U-bolts in normally non-supporting disposition below said first pair and adapted to become supporting during predetermined load conditions between a semi-trailer and said tractor.

2. In combination with a tractor having a bed portion, a coupling unit comprising: a fifth wheel; at least a pair of leaf spring units shackled to said bed portion and supporting said fifth wheel through bearings, leaves of said spring units being of length greater than their width and thickness and disposed longitudinally of the tractor; and overload spring units fastened to each unit of said pair of units in normally non-supporting relation and adapted to support said fifth wheel during certain load conditions of said tractor.

3. In combination with a tractor having a bed portion, a coupling unit comprising: a fifth wheel, leaf spring units shackled to said bed portion, the leaves of said spring units being of length greater than width and thickness and said spring units having a plurality of adjacent leaves with hooked ends adapted to connection to shackles and fastened by a strap to an adjacent leaf, said strap encircling said plurality of adjacent leaves having hooked ends and said adjacent leaf, being riveted to said adjacent leaf and welded to one of said plurality of adjacent leaves having hooked ends.

References Cited in the file of this patent

UNITED STATES PATENTS

| | | |
|---|---|---|
| 904,028 | Vollmer | Nov. 17, 1908 |
| 1,325,697 | Menhall et al. | Dec. 23, 1919 |
| 1,348,241 | Press | Aug. 3, 1920 |
| 2,163,875 | Hendrickson | June 27, 1939 |
| 2,204,940 | Mainard | June 18, 1940 |
| 2,821,409 | Chalmers | Jan. 28, 1958 |